United States Patent
Hwang

(10) Patent No.: US 6,293,226 B1
(45) Date of Patent: Sep. 25, 2001

(54) PET DRINKING DEVICE

(76) Inventor: Yaw-Shiun Hwang, 58, Ma Yuan West St., Taichung (TW)

(*) Notice: Subject to any disclaimer, the term of this patent is extended or adjusted under 35 U.S.C. 154(b) by 0 days.

(21) Appl. No.: 09/602,155

(22) Filed: Jun. 20, 2000

(51) Int. Cl.[7] ............ A01K 7/06; B65D 41/34; B65D 47/00
(52) U.S. Cl. ............ 119/72; 215/237; 215/306; 222/545
(58) Field of Search .............. 119/72, 72.5, 75; 215/235, 237, 306, 11.4; 222/181.1, 110, 111, 545, 546

(56) References Cited

U.S. PATENT DOCUMENTS

| D. 391,448 | * | 3/1998 | Winer et al. | D7/510 |
|---|---|---|---|---|
| 2,705,955 | * | 4/1955 | Nesset et al. | |
| 2,789,717 | * | 4/1957 | Demke . | |
| 3,529,575 | * | 9/1970 | Schalk | 119/72.5 |
| 3,589,338 | * | 6/1971 | Lovitz | 119/51.01 |
| 3,752,124 | * | 8/1973 | Gabriel | 119/72.5 |
| 3,771,496 | * | 11/1973 | Atchley | 119/72.5 |
| 4,132,225 | * | 1/1979 | Whattam . | |
| 4,787,337 | * | 11/1988 | Mayer | 119/477 |
| 5,301,634 | * | 4/1994 | Ho | 119/477 |
| 5,363,802 | * | 11/1994 | Huff | 119/475 |
| 5,447,118 | * | 9/1995 | Huff et al. | 119/477 |
| 5,653,353 | * | 8/1997 | Otto et al. | 215/306 |
| 5,669,329 | * | 9/1997 | Krause | 119/72.5 |
| 5,816,194 | * | 10/1998 | Huff | 119/72.5 |
| 5,901,882 | * | 5/1999 | Siegel | 222/131 |

* cited by examiner

Primary Examiner—Charles T. Jordan
Assistant Examiner—Yvonne R. Abbott

(57) ABSTRACT

A pet drinking device has a bottle having a threaded mouth, a cover engaging with the threaded mouth, a gasket, a sealing ring, a ball, a washer, and a sleeve. The sleeve has an inner thread and a through hole. The cover has a main body having an inner threaded portion, a tube connected to the main body, and the tube has a threaded end. The gasket is inserted in the main body of the cover. The sleeve engages with the threaded end of the tube. The sealing ring is disposed between the sleeve and the threaded end of the tube. The washer is inserted in an end of the sleeve. The ball is inserted in the through hole of the sleeve.

2 Claims, 5 Drawing Sheets

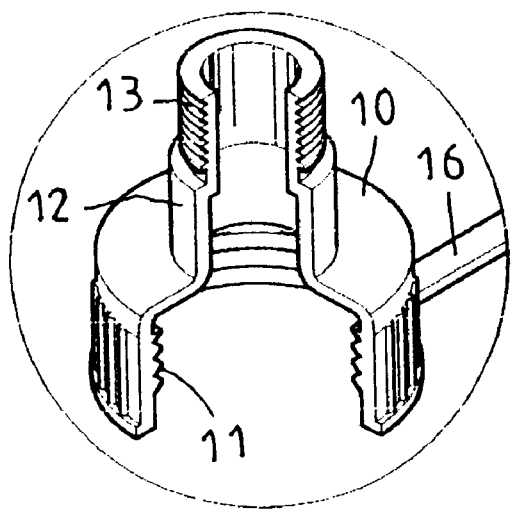
F I G. 1A
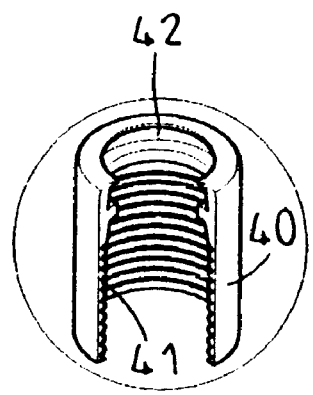
F I G. 1B

PET DRINKING DEVICE

BACKGROUND OF THE INVENTION

The present invention relates to a drinking device. More particularly, the present invention relates to a drinking device for pets such as dogs and cats.

A conventional pet drinking device is often fixed on a cage. It is not convenient to carry the conventional pet drinking device while the pets are walking.

SUMMARY OF THE INVENTION

An object of the present invention is to provide a pet drinking device which is portable outdoors.

Accordingly, a pet drinking device comprises a bottle having a threaded mouth, a cover engaging with the threaded mouth, a lid, a flexible rod connected to the lid and the cover, a gasket, a sealing ring, a ball, a washer, and a sleeve. The sleeve has an inner thread and a through hole. The cover has a main body having an inner threaded portion, a tube connected to the main body, and the tube has a threaded end. The gasket is inserted in the main body of the cover. The sleeve engages with the threaded end of the tube. The sealing ring is disposed between the sleeve and the threaded end of the tube. The washer is inserted in an end of the sleeve. The ball is inserted in the through hole of the sleeve.

DETAILED DESCRIPTION OF THE INVENTION

Figure 1:
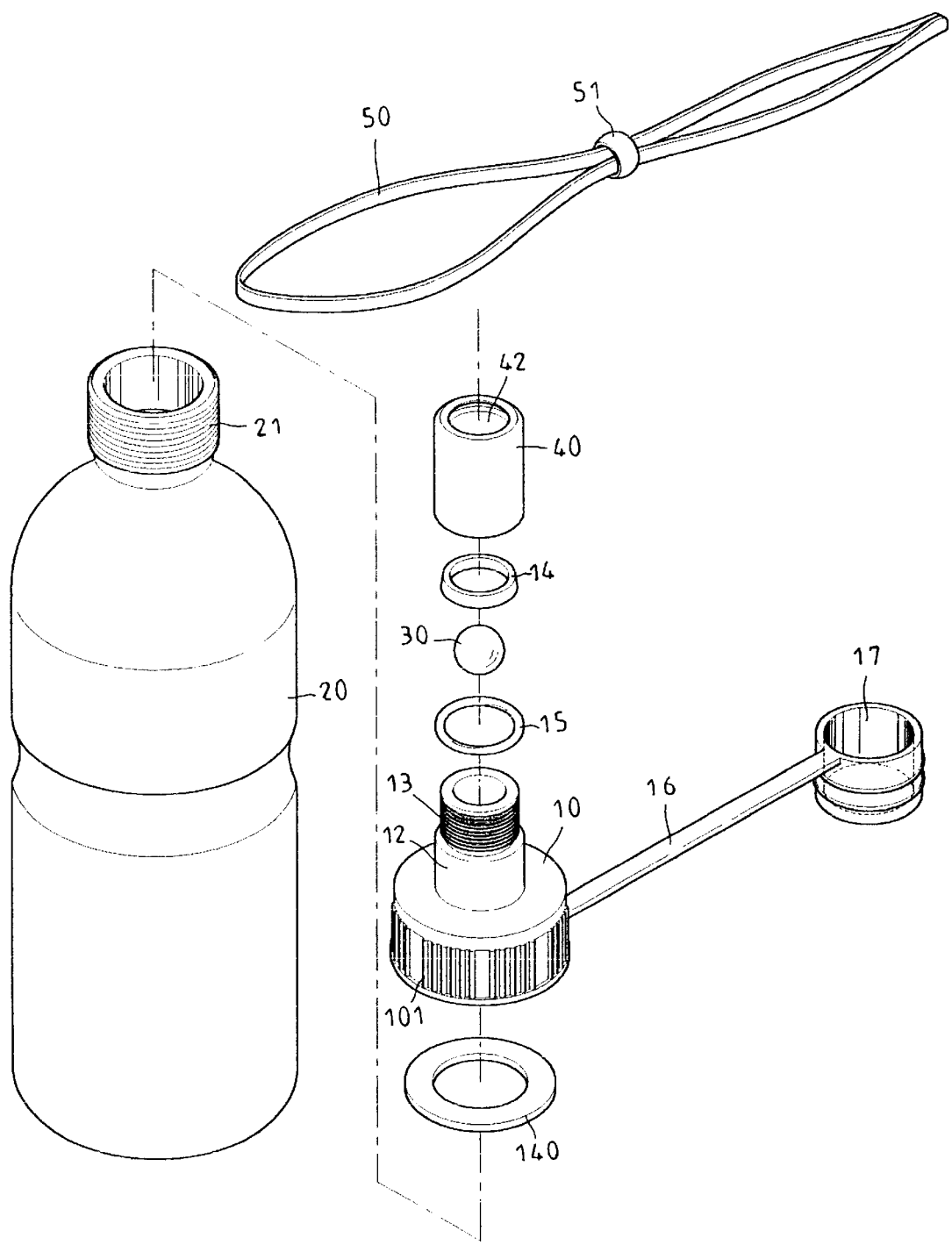
FIG. 1 is a perspective exploded view of a pet drinking device of a preferred embodiment in accordance with the present invention.

Referring to FIGS. 1 to 4, a pet drinking device comprises a bottle 20 having a threaded mouth 21, a cover 10 engaging with the threaded mouth 21, a lid 17, a flexible rod 16 connected to the lid 17 and the cover 10, a gasket 140, a sealing ring 15, a ball 30, a washer 14, and a sleeve 40.

The sleeve 40 has an inner thread 41 and a through hole 42.

The cover 10 has a main body 101 having an inner threaded portion 11, a tube 12 connected to the main body 101, and the tube 12 has a threaded end 13.

The gasket 140 is inserted in the main body 101 of the cover 10.

The sleeve 40 engages with the threaded end 13 of the tube 12.

The sealing ring 15 is disposed between the sleeve 40 and the threaded end 13 of the tube 12.

The washer 14 is inserted in an end of the sleeve 40.

The ball 30 is inserted in the through hole 42 of the sleeve 40.

Figure 2:
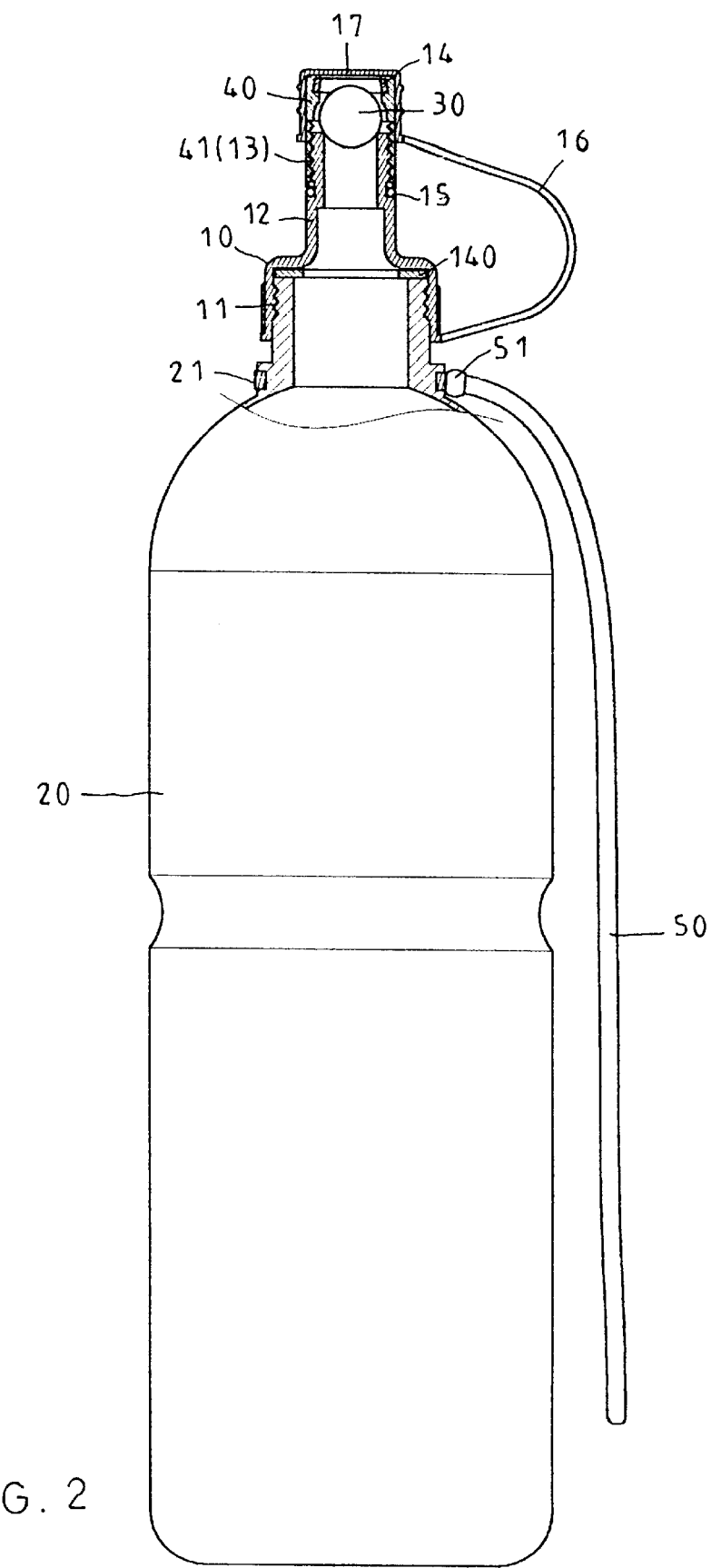
FIG. 2 is a sectional assembly view of a pet drinking device of a preferred embodiment in accordance with the present invention while a lid is closed.
Figure 3:
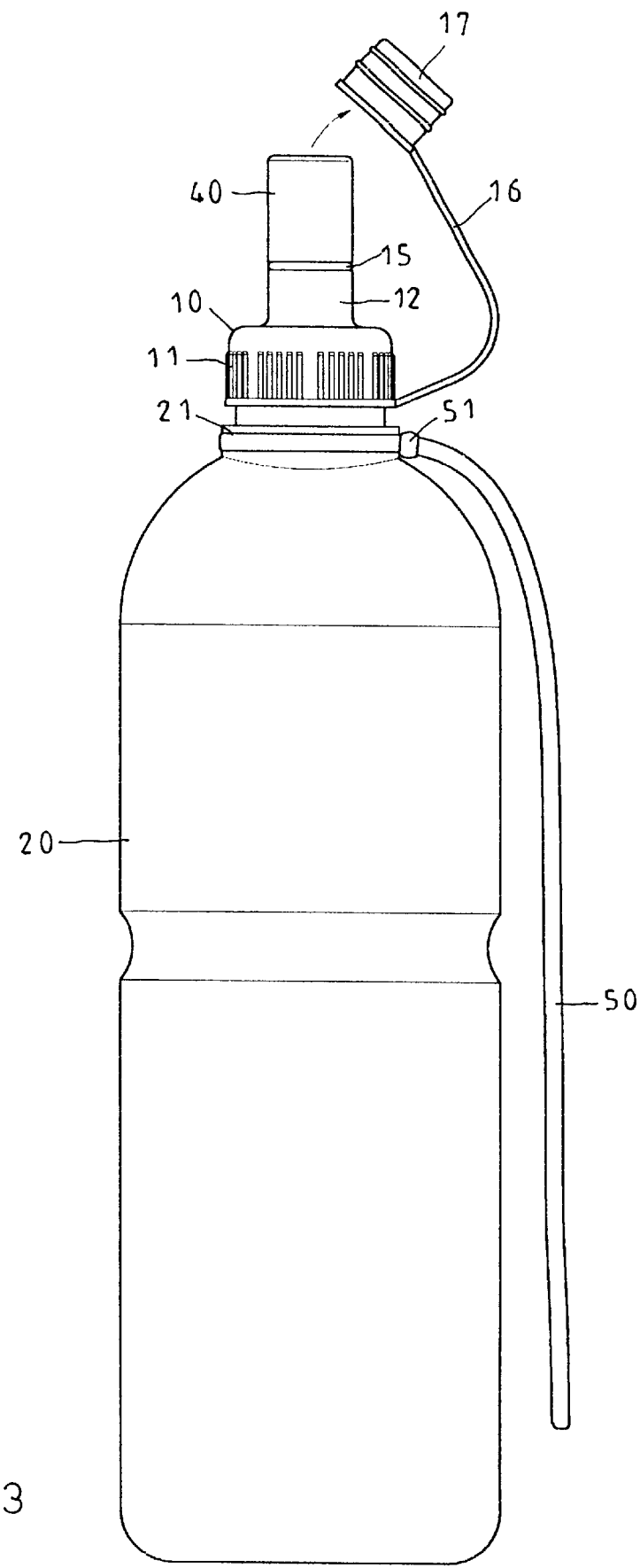
FIG. 3 is an assembly view of a pet drinking device of a preferred embodiment in accordance with the present invention while a lid is opened.

Referring to FIG. 2. again, a hoop 51 is disposed on the threaded mouth 21. A belt 50 is enclosed by the threaded mouth 21.

Figure 4:
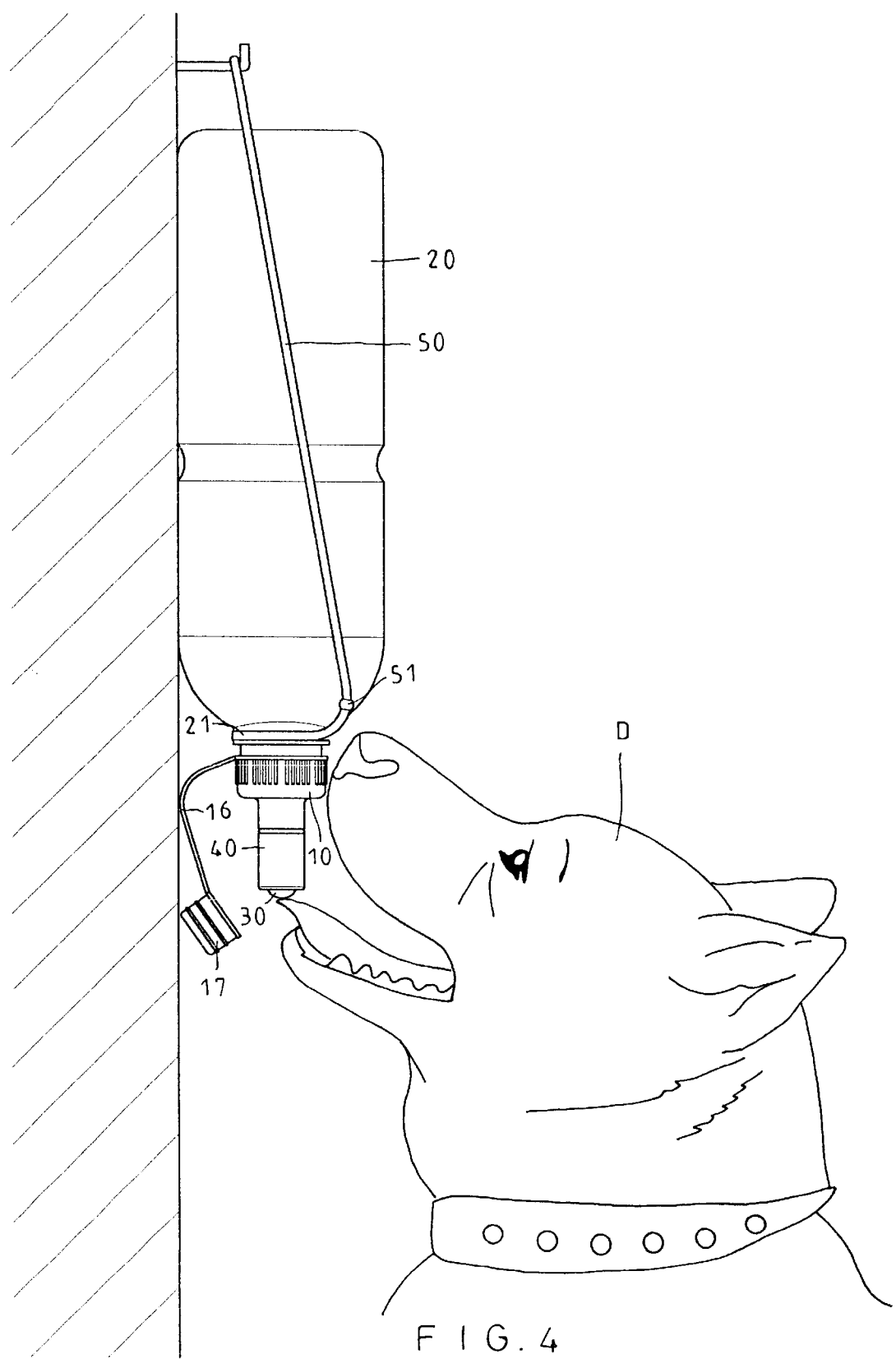
FIG. 4 is a schematic view illustrating an application of a pet drinking device of a preferred embodiment in accordance with the present invention.

Referring to FIG. 4, a dog D pushes the ball 30 upward. Then water in the bottle 20 will flow outward. When the ball 30 is not pushed upward, the ball 30 will seal the through hole 42 of the sleeve 40.

The invention is not limited to the above embodiment but various modification thereof may be made. Further, various changes in form and detail may be made without departing from the scope of the invention.

I claim:

1. A pet drinking device comprises:

a bottle having a threaded mouth, a cover engaging with the threaded mouth, a lid, a flexible rod connected to the lid and the cover, a gasket, a sealing ring, a ball, a washer, and a sleeve, the sleeve having an inner thread and a through hole, the cover having a main body having an inner threaded portion, a tube connected to the main body, and the tube having a threaded end, the gasket inserted in the main body of the cover, the sleeve engaging with the threaded end of the tube, the sealing ring disposed between the sleeve and the threaded end of the tube, the washer inserted in an end of the sleeve, and the ball inserted in the through hole of the sleeve.

2. The pet drinking device as claimed in claim 1, wherein a hoop is disposed on the threaded mouth, and a belt is enclosed by the threaded mouth.

* * * * *